US006218668B1

(12) United States Patent
Luke

(10) Patent No.: US 6,218,668 B1
(45) Date of Patent: Apr. 17, 2001

(54) COPLANAR INTERDIGITATED GRID DETECTOR WITH SINGLE ELECTRODE READOUT

(75) Inventor: Paul N. Luke, Castro Valley, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/112,399

(22) Filed: Jul. 8, 1998

Related U.S. Application Data
(60) Provisional application No. 60/051,899, filed on Jul. 8, 1997.

(51) Int. Cl.⁷ .............................. G01T 1/24; G01T 1/185
(52) U.S. Cl. .................... 250/370.01; 250/385.1; 250/389
(58) Field of Search ................... 250/370.01, 385.1, 250/370.14, 389; 257/428, 429, 430, 431

(56) References Cited

U.S. PATENT DOCUMENTS

| | | | | |
|---|---|---|---|---|
| 4,055,765 | * | 10/1977 | Gerber et al. .................... 250/370 |
| 4,064,440 | * | 12/1977 | Roder .............................. 250/359 |
| 4,751,391 | * | 6/1988 | Eberhard et al. ................ 250/385.1 |
| 5,530,249 | | 6/1996 | Luke ................................ 250/374 |
| 5,627,377 | * | 5/1997 | Hamilton, Jr. et al. ......... 250/370.13 |
| 5,742,061 | * | 4/1998 | Lemonnier et al. ............. 250/385.1 |
| 5,777,338 | * | 7/1998 | He ................................... 250/385.1 |
| 6,069,360 | * | 5/2000 | Lund ............................... 250/370.1 |

OTHER PUBLICATIONS

Luke et al., "Electrode Design for Coplanar–Grid Detectors," IEEE Transactions on Nuclear Science 44(3), Jun. 1997, pp. 713–720.*

Walton et al., "Amorphous Silicon/Crystalline Heterojunctions for Nuclear Radiation Detector Applications," IEEE Transactions on Nuclear Science 44(3), Jun. 1997, pp. 961–964.*

Luke et al., "A 140–element Ge Detector Fabricated with Amorphous Ge Blocking Contacts," IEEE Transactions on Nuclear Science 41(4), Aug. 1994, pp. 976–978.*

Luke et al., "Amorphous Ge Bipolar Blocking Contacts on Ge Detectors," IEEE Transactions on Nuclear Science 39(4), 1992, pp. 590–594.*

Luke, "Unipolar Charge Sensing with Coplanar Electrodes—Applications to Semiconductor Devices," IEEE Transactions on Nuclear Science 42(4), Aug. 1995, pp. 207–210.*

Luke et al., "Performance of CdZnTe Coplanar–Grid Gamma–Ray detectors," IEEE Transactions on Nuclear Science 43(3), Jun. 1996, pp. 1481–1486.*

* cited by examiner

*Primary Examiner*—Constantine Hannaher
(74) *Attorney, Agent, or Firm*—Henry P. Sartorio

(57) ABSTRACT

The coplanar interdigitated grid technique with single electrode readout provides substantial spectral performance improvement over that of conventional full-area planar electrode detectors and over coplanar interdigitated grid detectors which measure the difference between the induced charge signals from two interdigitated coplanar grid electrodes. The signal from only one interdigitated grid electrode is read out. The signal response is optimized by changing the relative areas of the two grid electrodes and the bias applied across the detector. Only one preamplifier is needed and signal subtraction is not necessary. This eliminates the electronic noise contribution from the additional preamplifier used in the normal coplanar grid implementation, and conventional single-amplifier detector electronics can be used.

20 Claims, 7 Drawing Sheets

COPLANAR INTERDIGITATED GRID DETECTOR WITH SINGLE ELECTRODE READOUT

RELATED APPLICATIONS

This application claims priority of provisional application Ser. No. 60/051,899 filed Jul. 8, 1997.

GOVERNMENT RIGHTS

The United States Government has rights in this invention pursuant to Contract No. DE-AC03-76SF00098 between the United States Department of Energy and the University of Calif.

BACKGROUND OF THE INVENTION

The present invention relates to radiation detection, and more specifically to single polarity charge carrier sensing in ionization detectors.

Radiation detectors using simple planar electrodes and based on ionization measurements often suffer from poor collection of charge carriers of certain polarity types. For example, positive charge carriers (holes) may migrate through the detector medium at a much slower rate than negative charge carriers (electrons). As a result, such detectors produce signals that vary in amplitude depending on the location within the detector at which incident radiation interacts with the detector medium. Such detectors include semiconductor detectors, liquid ionization detectors, and gas ionization detectors.

In a simple planar electrode ionization detector, full-area electrodes are formed on two opposing faces of the detector medium. A bias voltage applied across the two electrodes provides an electric field to separate and collect the charge carriers that are created by the absorption of radiation in the detector medium. Induced charge signal on one of the electrodes due to the motion of carriers provides a measure of the energy of the radiation. Incomplete charge collection due to carrier trapping or slow carrier transport results in reduced signals, which vary in strength depending on the depth of radiation interaction. This degrades the energy resolution of the detector.

U.S. Pat. No. 5,530,249 describes a method and apparatus to improve the energy resolution of ionization-type radiation detectors suffering from incomplete charge collection. Two interlaced or interdigitated electrodes are used to sense the movement of charge carriers within the detector. The induced charge signals on these electrodes are subtracted to give a net signal that yields substantially improved energy resolution.

Thus, by reconfiguring the charge sensing electrode on a detector into a pair of interdigitated electrodes, the signal response can be modified such that the signal amplitude variation caused by poor carrier transport properties is greatly reduced. The coplanar interdigitated grid detector uses two interdigitated electrodes on the detector for charge sensing. The desired signal response is obtained by subtracting the induced signals on the two grid electrodes. By changing the relative gain of the two signals before subtraction, the detector response can be effectively tuned to match the charge transport properties of the material and thus optimize the spectral response.

While the two-electrode readout interdigitated grid detector is far superior to the full-area electrode detector, there are the problems of more complex and costly electronic circuitry, involving a two channel amplifier system with subtraction circuit, and greater electronic noise. Thus it would be desirable to have a detector which has the advantages of the interdigitated electrode structure, but with simpler electronics.

SUMMARY OF THE INVENTION

The invention is an ionization detector having a pair of coplanar interdigitated grid electrodes with single electrode readout. The detector signal is obtained from one of the pair of interdigitated electrodes whose relative areas are chosen to optimize performance. Only one electrode, the collecting electrode, is used to sense charge carriers. Only one channel of signal processing electronics is required and signal subtraction is not used.

According to the invention, one of the two opposing electrodes of an otherwise conventional detector is divided into two independent electrodes that are substantially interlaced. Each of the two electrodes may be a contiguous electrode or may consist of multiple electrode elements that are electrically connected together external to the detector. Each of the two electrodes may consist of interdigitated parallel strip electrode elements or elements of other shapes. As in the planar electrode detector, a bias voltage is applied across the detector to separate and collect the carriers. In addition, a smaller bias voltage is applied between the two interdigitated electrodes such that all carriers that drift in the direction of these two electrodes are collected at only one electrode. Only the induced signal on the collecting electrode is utilized for signal processing. By using different ratios of areas for the two interdigitated electrodes, different charge induction characteristics for the collecting electrode can be realized. Depending on the degree of charge trapping, there is an optimal charge induction characteristic that provides the best energy resolution. Therefore, by choosing an appropriate ratio of electrode areas, the detector response is optimized and the energy resolution of the detector is significantly improved.

Since the degree of charge trapping in a detector is affected by electric field as well as material properties, the design of the electrodes is optimized for the expected operating voltage of the detector. In practice, the electrodes can be designed to provide optimal response assuming a set of nominal charge trapping and detector operating parameters. Final optimization can then be achieved by adjusting the actual operating bias voltage of the detector.

The invention functions most effectively on detectors in which the collection efficiency of one polarity type of carriers is significantly worse than that of the opposite polarity type. This situation occurs in many types of detectors, such as compound semiconductor detectors (CdTe, CdZnTe, $HgI_2$, etc.), gas ionization detectors and liquid ionization detectors, where the positive carriers (holes or ions) are much more poorly collected compared to the negative carriers (electrons). For these detectors, the optimal design for the electrodes is determined by the collection efficiency of electrons. For good electron collection, one would use a smaller collecting electrode.

The present detector is similar to the detector of U.S. Pat. No. 5,530,249 in that two interlaced electrodes are employed. They differ however in the way that optimal induced signals are obtained. In the previous detector, optimal response is obtained by subtracting the signal of one electrode from that of the other, whereas the present detector relies on selecting the relative areas of the two electrodes to give the desired signal response from only a single electrode. Only one electronic amplifier is required to process the signals in the present detector, compared to the previous case which requires two amplifiers and a signal subtraction circuit. Therefore, the electronics is much simplified and it is similar to that used in conventional full-area planar electrode detectors.

DETAILED DESCRIPTION OF THE INVENTION

Figure 1:
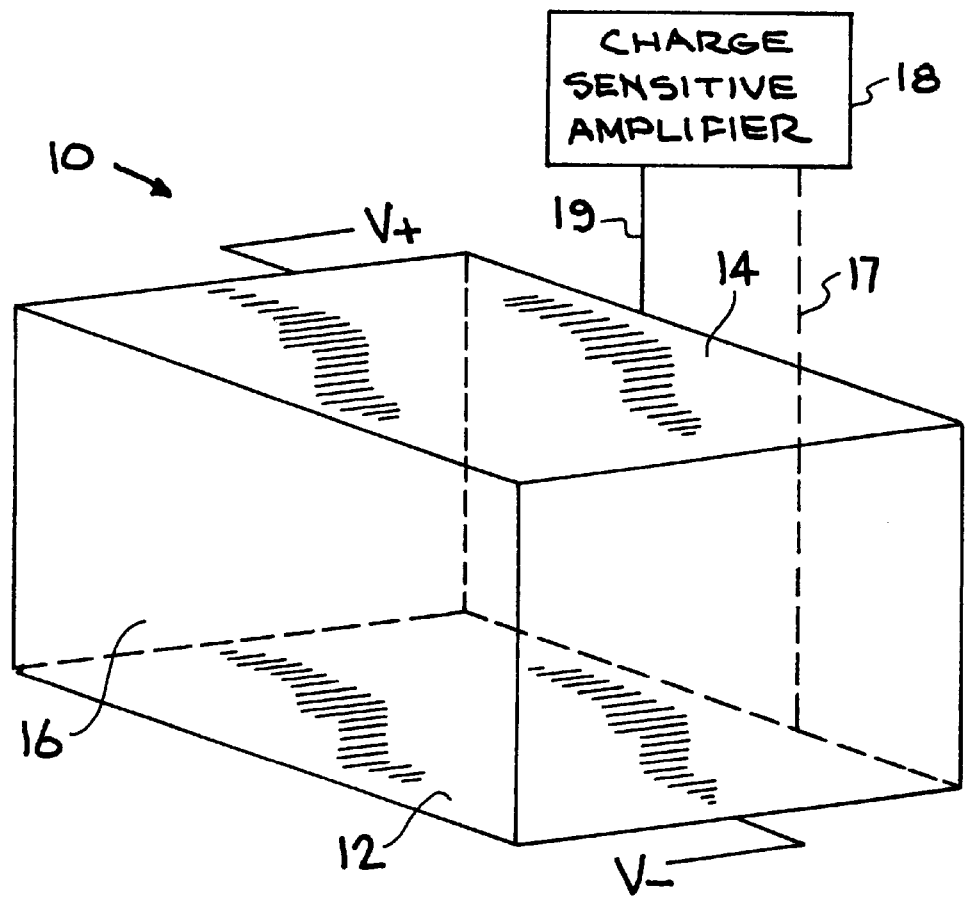
FIG. 1 is a perspective view of a prior art semiconductor ionization detector having a full-area electrode configuration.

FIG. 1 shows a prior art semiconductor ionization detector 10 having a conventional electrode configuration. Full area electrodes 12, 14 are deposited on two opposing faces of detector body 16. Radiation absorbed within detector 10 creates negatively charged carriers (electrons) and an equal number of positively charged carriers (holes). When a voltage potential is applied across electrodes 12, 14, electrons will drift towards the positively biased electrode (anode) 14, and holes will drift towards the negatively biased electrode (cathode) 12. A charge sensitive amplifier 18 is typically connected to one of the electrodes 12 or 14, as represented by dashed line 17 or solid line 19, to measure the induced charge due to the movement of the charge carriers.

Figure 2:
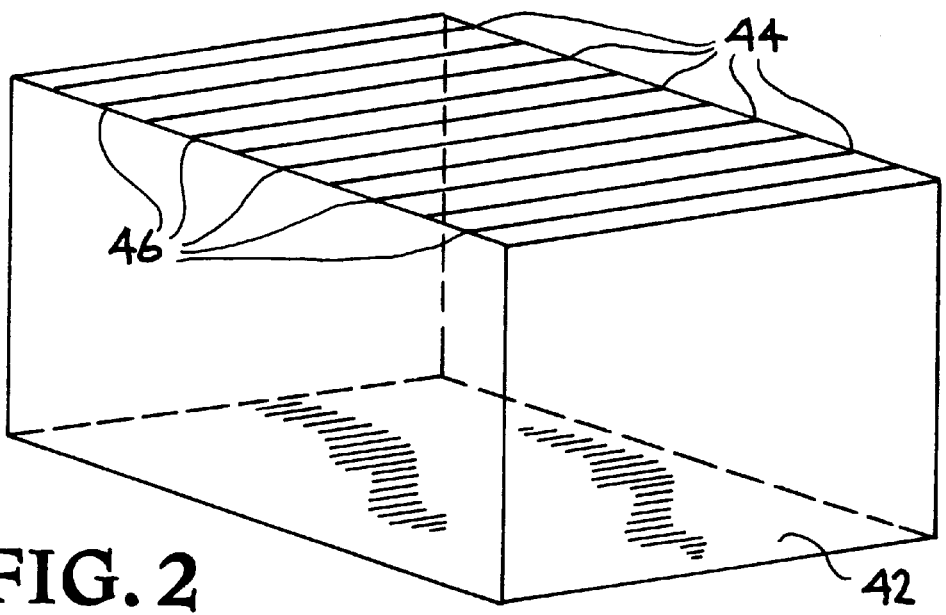
FIG. 2 is a perspective view of a prior art coplanar interdigitated grid electrode structure which can be used in the present invention.

FIG. 2 is a perspective view of a prior art interdigitated electrode configuration on a semiconductor ionization detector 40. Detector 40 has a full area cathode (or anode if polarity is reversed) 42 on one side. Two independent and substantially interlaced sets or grids (interdigitated electrodes) 44, 46 of electrode elements are formed in a substantially symmetric arrangement opposing cathode 42. Interdigitated electrodes 44, 46 function as an anode (or cathode if polarity is reversed).

Detector 40 uses the interdigitated electrode structure with a signal subtraction (two electrode readout) technique to obtain signals whose amplitude variation is not position dependent. The magnitude of measured signals does not vary significantly regardless of where the collected charge carrier is generated within the detector.

Figure 3:
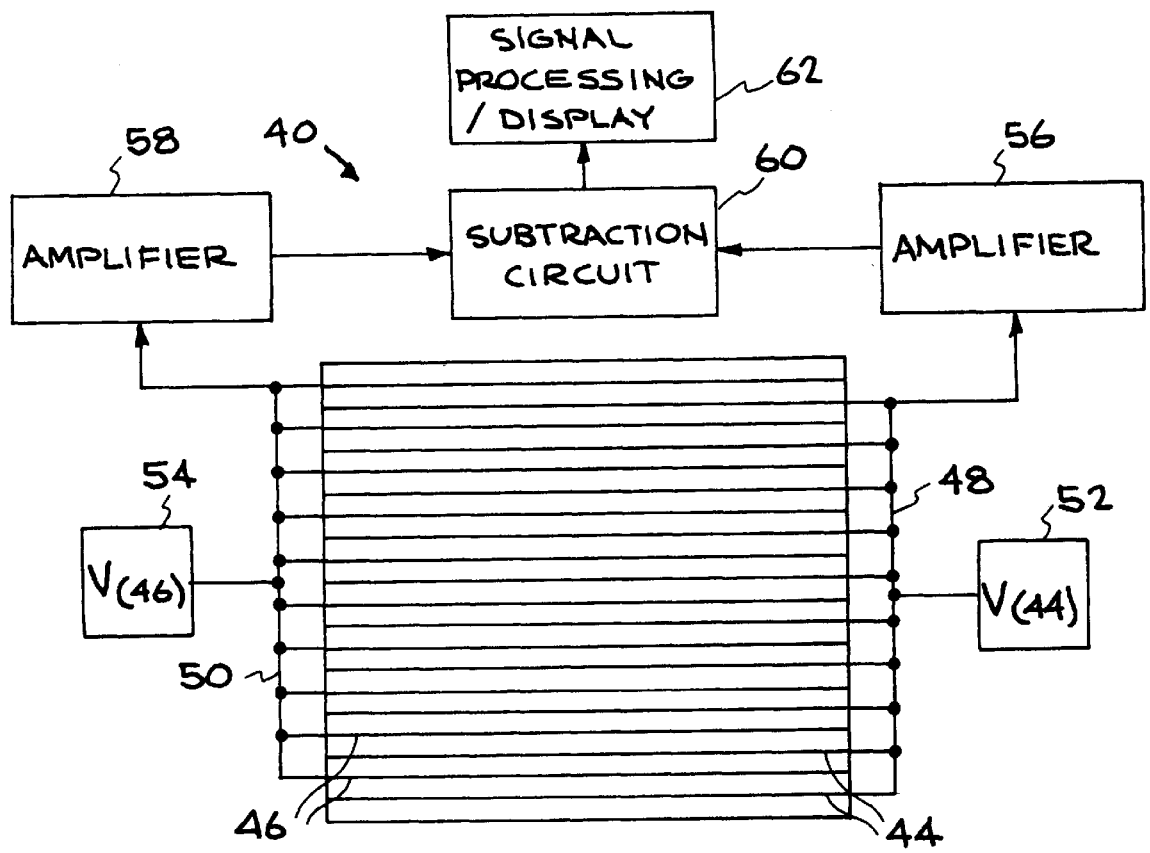
FIG. 3 is a top view of a prior art two-electrode-readout semiconductor ionization detector having an interdigitated electrode structure of FIG. 2.

FIG. 3 is a top view of prior art detector 40 showing the two electrode readout electronics. All the electrode elements of electrode 44 are connected to an electrical terminal 48. All the electrode elements of electrode 46 are connected to an electrical terminal 50. Voltage potentials $V_{(44)}$ and $V_{(46)}$ of positive polarity are applied by voltage sources 52, 54 to terminals 48, 50 of interdigitated electrodes 44, 46 respectively. The voltage applied to electrode 44 is greater than the voltage applied to electrode 46 so that the negative charge carriers are collected at electrode 44. A relatively uniform electric field is generated inside semiconductor detector 40 by applying a potential of negative polarity to opposing cathode 42. As a result, negative charge carriers drift towards interdigitated electrodes 44, 46.

When a negative charge carrier drifts from cathode 42 towards electrodes 44, 46, an increasing charge signal is induced separately on electrodes 44, 46. For most of the distance travelled by the negative charge carrier, the signals induced at electrodes 44, 46 are almost identical. The two signals will only deviate significantly from each other when the negative charge carrier drifts within close proximity of electrodes 44, 46, i.e. approaches the collecting electrode element of either electrode 44,46. By making the pitch of the electrode elements of electrodes 44, 46 small compared to the thickness of detector 40, the difference between signals obtained at electrodes 44, 46 will be extremely small for almost the entire volume of detector 40.

The induced charge signals on grid electrodes 44,46 are passed through amplifiers 56, 58 respectively. The amplified charge signals from amplifiers 56, 58 are input into a subtraction circuit 60 whose output can be input into additional signal processing and/or display system 62.

Figure 4:
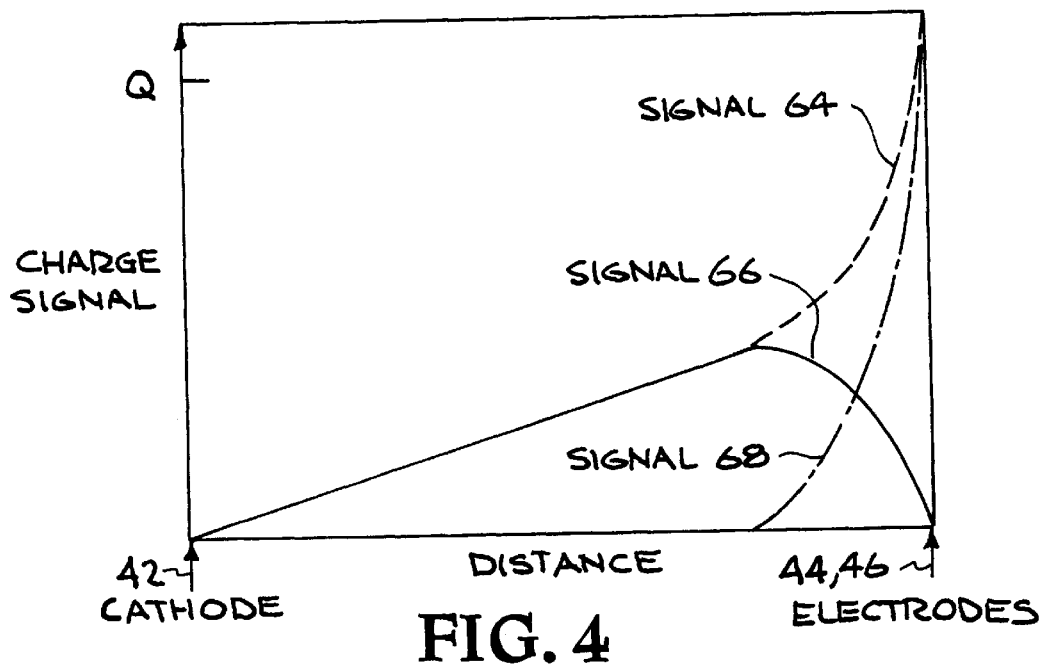
FIG. 4 is a simplified graph of charge signal vs. distance of a negative charge carrier.

FIG. 4 is a simplified graph of charge signal vs. distance of the charge carrier from electrodes 44, 46. If the negative carrier is collected at electrode 44, the charge signal 64 induced at electrode 44 will rise to a final value equal to the charge of the carrier, while the signal 66 induced at electrode 46 will return to zero. Therefore, by subtracting one signal from the other, e.g. signal 64 minus signal 66, the response to the initial movement of the negative charge carrier is cancelled out. A difference signal 68 is only developed when the negative charge carrier is within a small distance of the collecting element of the electrode. Signal 68 has a zero value until the negative charge carrier closely approaches electrodes 44, 46. As a result, difference signal 68 is generated mainly due to the collection of charge carriers of a single polarity. Thus the signal amplitude variation of detector 40 is not dependent upon the location at which charge carriers are generated over most of the volume of detector 40. By adjusting the relative gain between the two grid signals prior to subtraction, the difference signal can be made less sensitive to the poor carrier transport properties of the detector material and thus improve the spectral response of the detector.

The present detector uses electrode design to control the charge induction on the sensing electrodes, with measurement of the induced charge signal on only one of the grid electrodes. The optimal signal response is achieved by adjusting the relative areas of the two grid electrodes. By changing the relative area of the sensing grid electrode, the charge induction characteristics of that electrode can be varied to obtain a uniform detector response for the specific carrier transport properties of the detector material. This single-electrode-readout technique requires only one amplifier and thus gives reduced electronic noise. Control of the charge induction with adjustment of the grid area and bias optimization is used to achieve better detector performance.

Figure 5A:
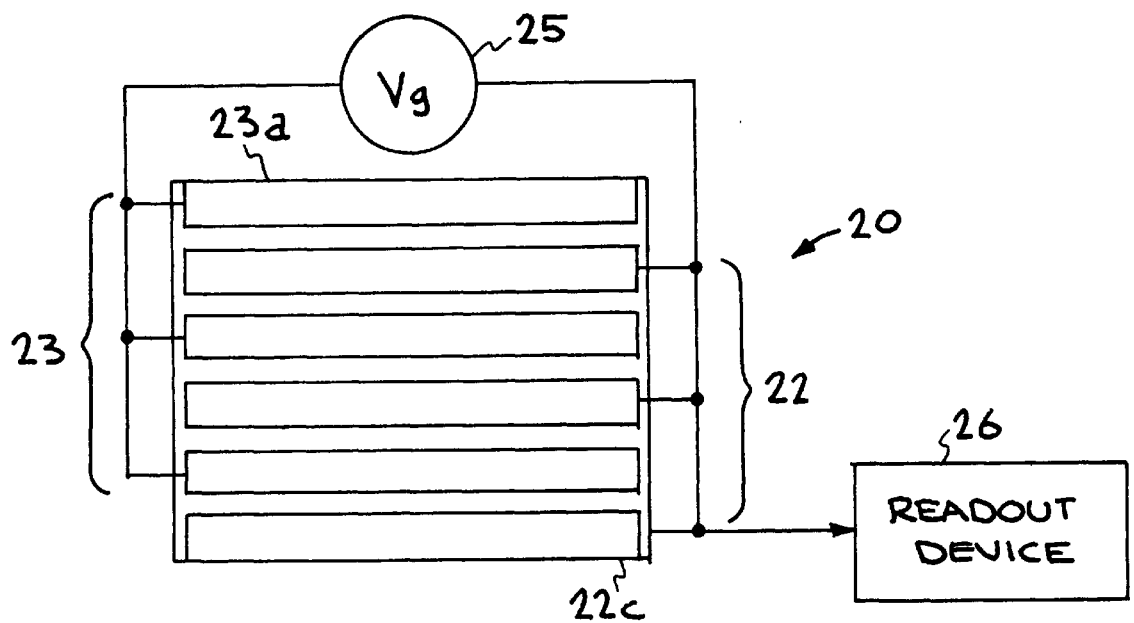
FIGS. 5A, B are top and side views of the single-electrode-readout interdigitated grid detector of the invention.

The geometry and electronic configuration of the coplanar interdigitated grid detector 20 of the invention is shown in FIGS. 5A, B. The electrodes consist of a full-area contact electrode 21 placed on one side of the detector and a pair of interdigitated grid electrodes 22, 23 patterned on the opposing detector surface. Grid electrode 22 is shown as having three linear strip elements 22a, b, c and grid electrode 23 is shown as having three linear strip elements 23a, b, c but there can be any number and the electrode elements can have other shapes, e.g. interlaced spirals or interconnected dots. In the normal mode of operation, a large bias $V_b$ (e.g. 100–3000V) from source 24 is applied between the full contact electrode 21 and the grid electrodes 22, 23 so that the charge carriers created by radiation interactions are collected across the detector. The bias polarity is such that the electrons drift towards the grid electrodes 22, 23. A bias $V_g$ (e.g. 10–100 V) from source 25 is also applied between the two grid electrodes 22, 23 to ensure that these electrons will only be collected on one of the grids, grid 22, referred to as the collecting grid. This bias is small relative to that applied across the detector so that the field within the bulk of the detector remains substantially uniform. A readout device 26 is connected to only one of the grid electrodes, collecting grid 22.

Figure 5B:
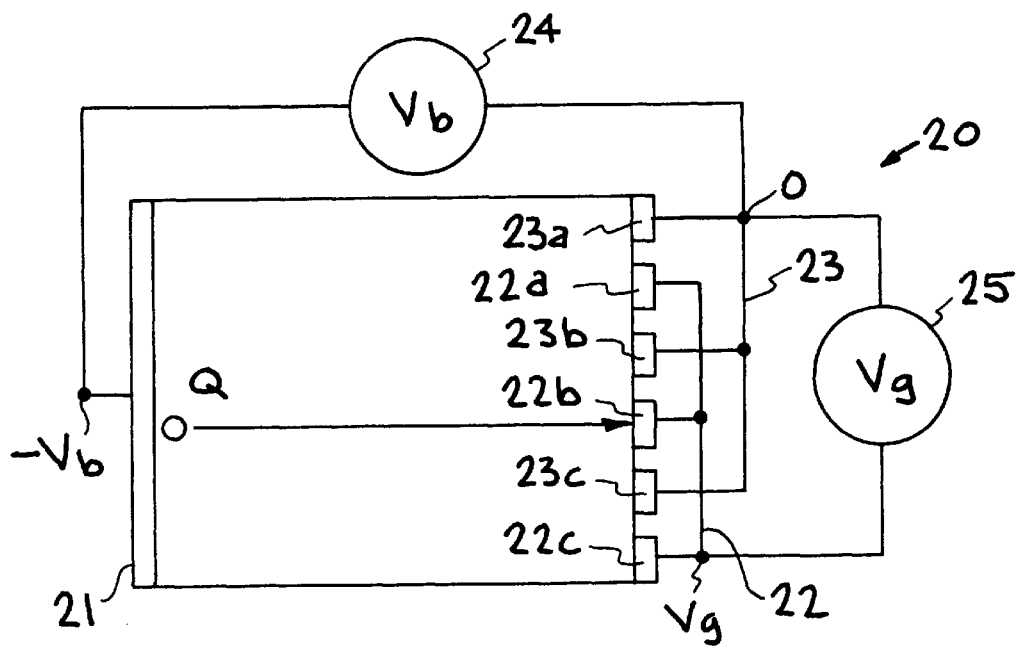

In one of the simplest grid configurations, the individual grid elements 22a–c and 23a–c of each grid are of identical width and equal spacing. For a charge Q drifting from the full-area electrode 21 in a straight trajectory to one of the collecting grid elements 22b, as shown in FIG. 5B, the charge induced on the detector electrodes 22, 23 as a result of the drifting charge can be determined through the weighting potential method.

Figure 6A:
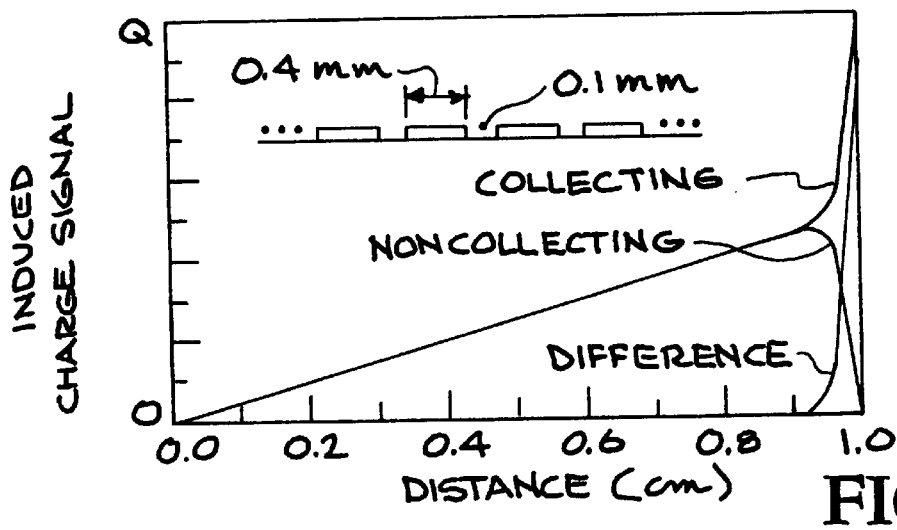
FIG. 6A shows calculated induced charge signals on the grid electrodes and the difference signal.

The calculated induced charge signals from the two grids 22, 23 assuming no charge trapping are shown in FIG. 6A. The detector is 1 cm thick and infinite in lateral dimensions, and the line width of the grid electrode elements are 0.4 mm with a gap spacing of 0.1 mm. The two signals are the same until the charge drifts near the grids, at which point the signal from the collecting grid rapidly increases to Q and that from the noncollecting grid decreases to zero. This behavior can be understood based on the idea that the charge induced on an electrode is proportional to the number of electrostatic field flux lines connecting the drifting charge to the particular electrode. For the case when Q is far from the grids, the flux lines will be evenly distributed between the two grids because of their interdigitated pattern and their identical size. As the charge moves towards the grids, the density of the flux lines terminating on the grids increases yet remains equally shared between the two grids. However, when the charge drifts into the region very near the grids, it becomes much closer to the particular collecting grid element on which collection will ultimately take place relative to the distance to the other grid elements. The number of flux lines terminating on this collecting grid element will then rapidly increase at the expense of all other grid elements, thus producing the rapid rise in collecting grid signal and the corresponding fall in noncollecting grid signal. This part of the detector where there is a rapid rise in the induced charge signal is referred to as the near-grid region and the remainder of the detector as the far-grid region.

This unique charge induction response was used in the prior art two electrode readout detector of FIG. 3 to reduce the loss of spectroscopic resolution caused by poor hole collection. If the noncollecting grid signal is subtracted from that of the collecting grid, as shown in the difference curve of FIG. 6A, the resultant signal becomes insensitive to the charge drifting in the far-grid region, and the full signal is developed only as Q drifts through the small near-grid region.

The above analysis has neglected electron trapping which, when included, reintroduces a depth dependence to the detector response. Interaction events which take place farther from the grids result in a smaller number of electrons collected through the near-grid region because of trapping.

Figure 6B:
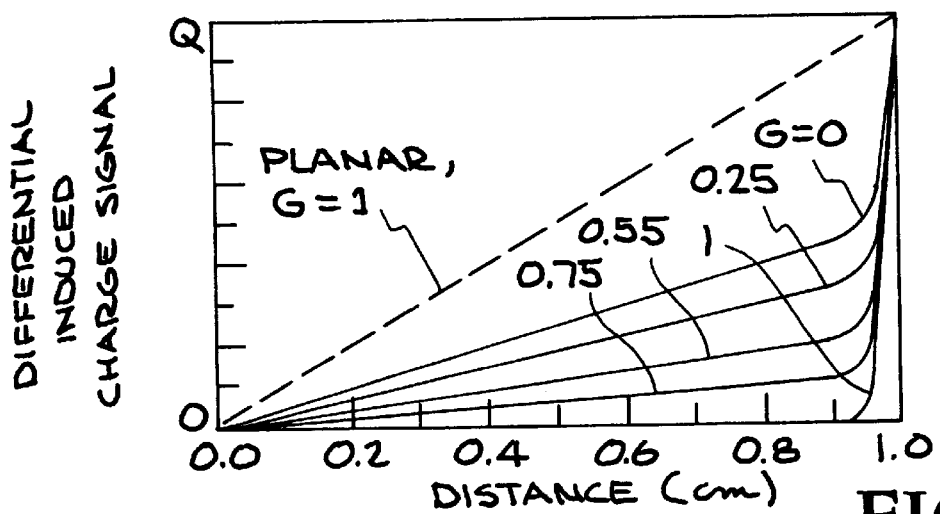
FIG. 6B shows differential induced charge signals for different gains G of the noncollecting grid signal subtracted from the collecting grid signal.

One method to adjust the charge induction characteristics and correct for electron trapping is to subtract only a fraction G of the noncollecting grid signal from that of the collecting grid (G is thus the relative gain of the two signals). The differential induced charge signal as a result of the charge Q drifting from the full-area electrode to the collecting grid is shown in FIG. 6B for various values of G. By changing G, the amount of charge induction caused by carriers drifting within the far-grid region can be varied. Adjustment of G thus allows a specific amount of charge induction to be added to compensate for the amount of charge loss due to electron trapping.

Figure 7:
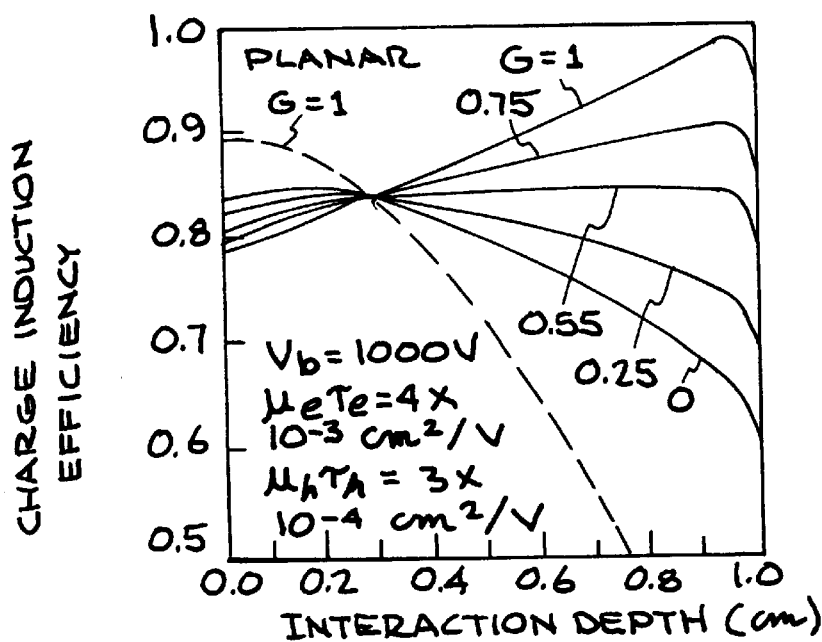
FIG. 7 shows calculated charge induction efficiency as a function of radiation interaction depth for different values of G.

A way to characterize the uniformity of the detector response with radiation interaction depth is to calculate the charge induction efficiency as a function of this depth. The charge induction efficiency is the net induced charge as a result of charge collection, normalized to the charge originally created. A flat charge induction efficiency plot is indicative of a uniform response that would give optimal spectral performance. FIG. 7 is the calculated charge induction efficiency as a function of radiation interaction depth as measured from the full-area electrode for a 1 cm thick CdZnTe detector operated at 1000 V bias. For this detector and applied bias, G=0.55 produces the most uniform response. The highly nonuniform response of a planar detector is plotted for comparison. When the two grid signals are subtracted with unity gain, G=1, the detector response suffers significantly from electron trapping. By decreasing G, the response can be made more flat and ultimately optimized to produce the nearly uniform response of the G=0.55 case.

Figure 8A:
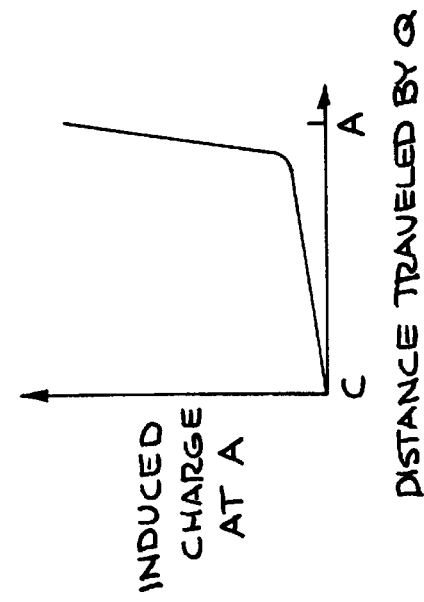
FIGS. 8A–D illustrate the effect of changing the relative area of the collecting grid on the induced charge on the collecting grid.
Figure 8C:
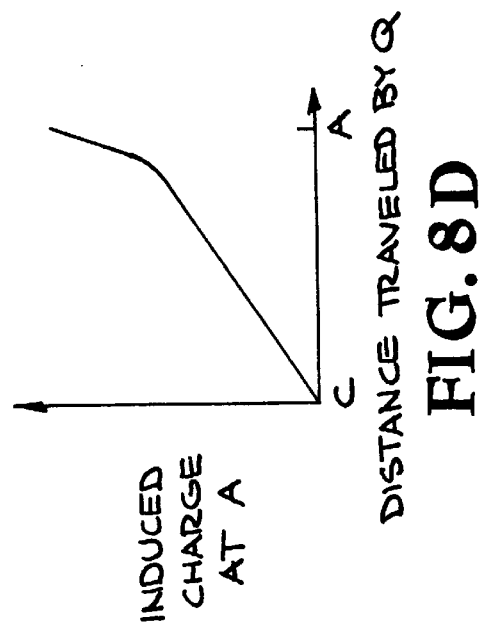
Figure 8B:
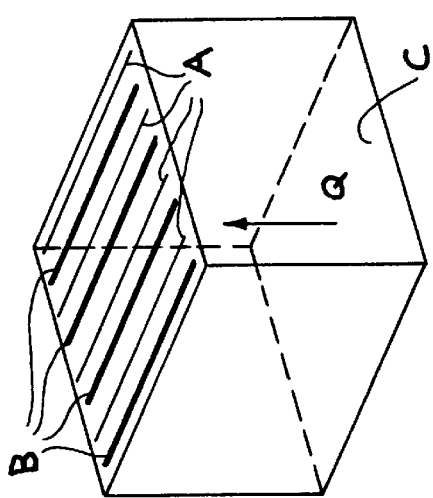
Figure 8D:
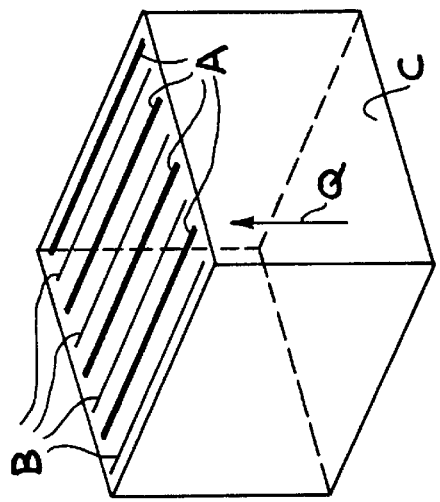

In the prior art two electrode readout coplanar interdigitated grid detector, the charge induction characteristics are adjusted to suit the particular detector material parameters and bias conditions by varying the relative gain of the two grid signals prior to subtraction. The present invention with single electrode readout uses another method to achieve a similar result, i.e. changing the geometry (area) of the grid electrodes. For example, by decreasing the electrode area of one grid relative to the other, the induced charge on the smaller area grid as a result of charge movement within the far-grid region is reduced while that of the other grid is increased. FIG. 8A shows a detector having a collecting grid A with smaller grid line widths than noncollecting grid B. The induced charge at A as a function of the distance from the cathode C is shown in FIG. 8B. In FIG. 8C the grid line widths of A are greater than B, and the induced charge is shown in FIG. 8D.

Figure 9:
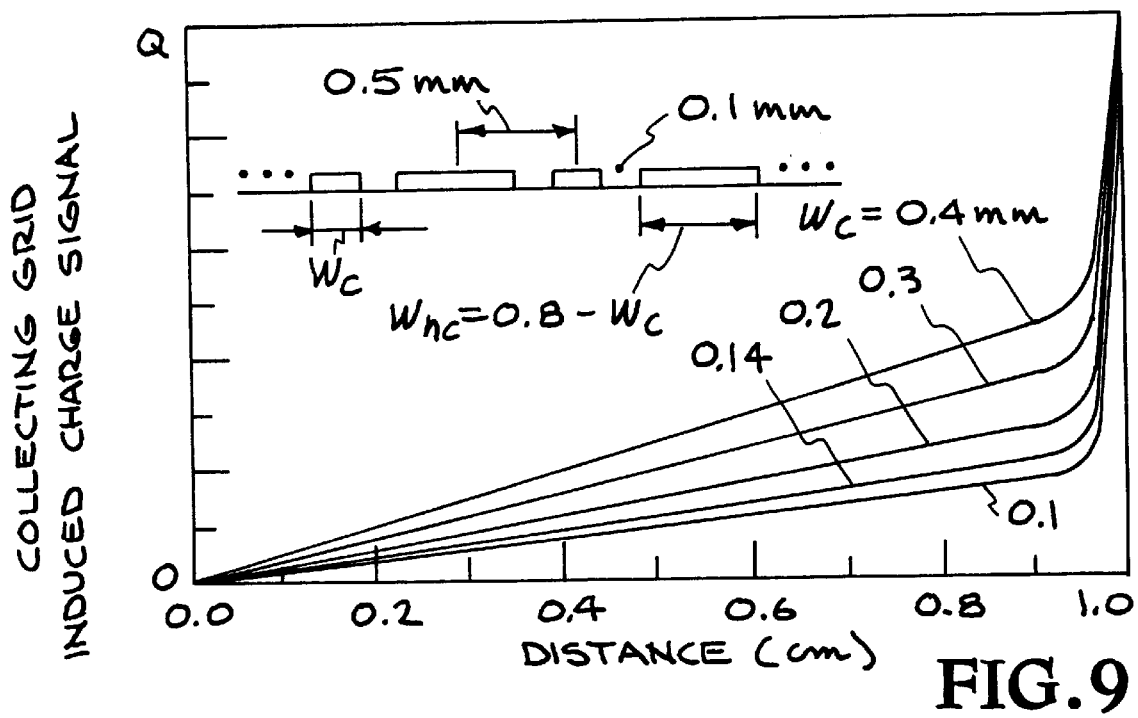
FIG. 9 shows the calculated induced charge signal on the collecting grid for different collecting grid line widths.

If the collecting grid line width ($w_c$) is decreased and the noncollecting grid line width ($w_{nc}$) is increased such that the center-to-center spacing of the grid lines and the gap between the lines ($w_g$) both remain constant, the calculated induced charge signals from the collecting grid as a result of a charge Q drifting from the cathode to the collecting grid for various electrode widths are shown in FIG. 9. Typically, $w_c$ is 0.1 1.0 mm, $w_{nc}$ is 0.1 to 2.0 mm, $w_g$ is 0.1 to 0.3 mm. The rate of charge induction before Q reaches the near-grid region decreases as the collecting grid line width decreases. The corresponding signals (not shown) for the noncollecting grid would show the rate of charge induction increasing. Again, the charge induction characteristics can be qualitatively understood by using the electrostatic-flux-line argument. When Q is drifting within the far-grid region and the electrode widths are the same ($w_c=w_{nc}=0.4$ mm), the charge induction is the same for the two grids because the flux lines are equally distributed between the two grid sets. When the collecting grid line width is reduced relative to that of the noncollecting grid, fewer flux lines will terminate on the collecting grid, since it simply occupies a smaller area of the detector surface, while that of the noncollecting grid will increase. The induced charge and the rate of charge induction in the far-grid region will therefore decrease on the collecting grid. The charge induction within the near-grid region behaves similarly as before in that the induced charge signal rapidly rises to Q.

In comparing the induced charge signals of FIG. 9 to those of FIG. 6B, it becomes clear that by changing the electrode widths one can obtain charge induction signals from one grid electrode that resemble those realized through signal subtraction. In this example, the single-grid signal obtained with $w_c=0.14$ mm matches that of the optimal differential signal measured using the prior art coplanar grid method with G=0.55. Optimal detector performance can therefore be achieved by measuring the induced charge signal from only the collecting grid electrode, in contrast to the prior art coplanar grid technique which required the measurement and subsequent subtraction of both grid signals. This single-electrode-readout technique has the advantages that the measurement electronics are simpler since a conventional single-amplifier system can be used, and that the electronic noise will be less because the noise contribution from one of the two amplifiers required in the prior art coplanar grid technique is eliminated.

Figure 10:
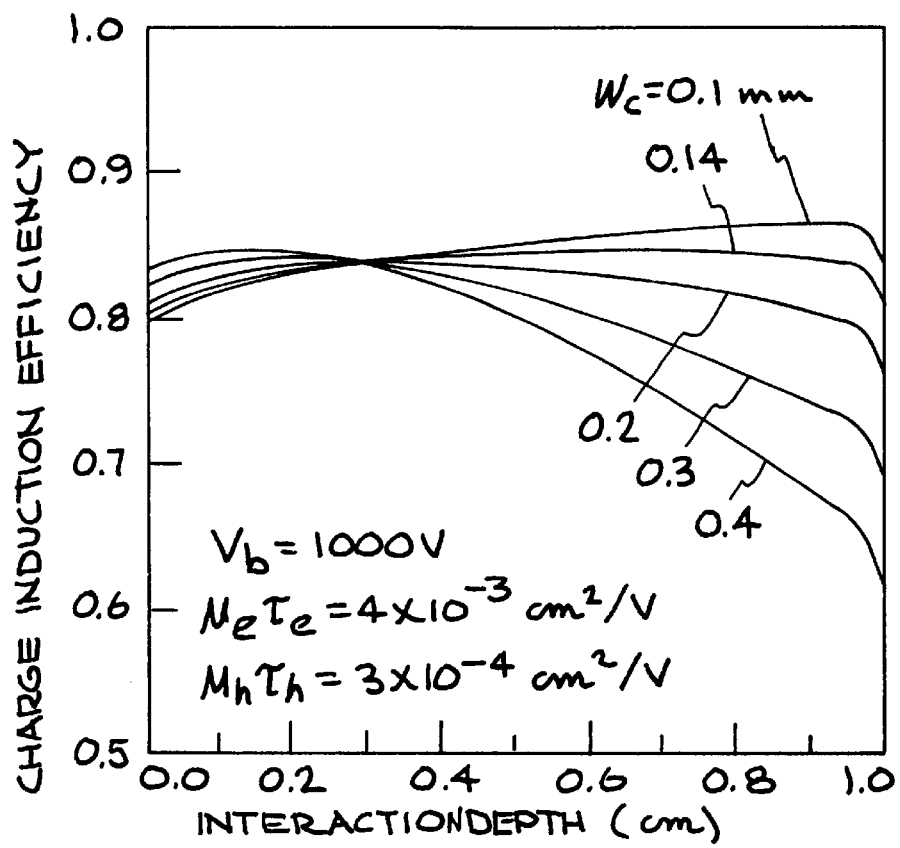
FIGS. 10A, B show the calculated charge induction efficiency as a function of radiation interaction depth for different collecting grid line widths and different bias voltages respectively.

To further substantiate that detector performance can be optimized by adjusting the electrode width (or area) ratio, FIG. 10A shows the charge induction efficiency of a single-electrode-readout coplanar grid detector. By reducing the collecting grid line width to 0.14 mm and increasing that of the noncollecting grid to 0.66 mm, a reasonably flat charge induction efficiency results with a uniformity nearly identical to that of the optimized two-electrode-readout coplanar grid detector. Generally the preferred ratio of the area of the noncollecting grid electrode to the area of the collecting grid electrode is in the range of about 1:1 to about 20:1.

Figure 10B:
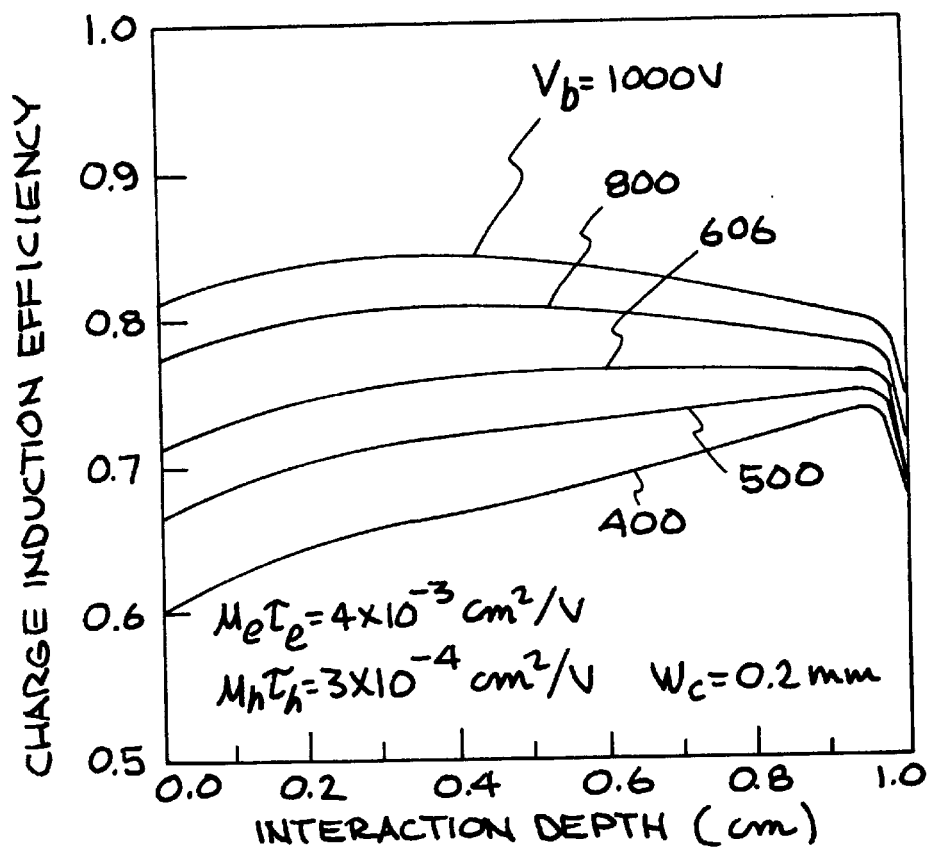
Figure 11:
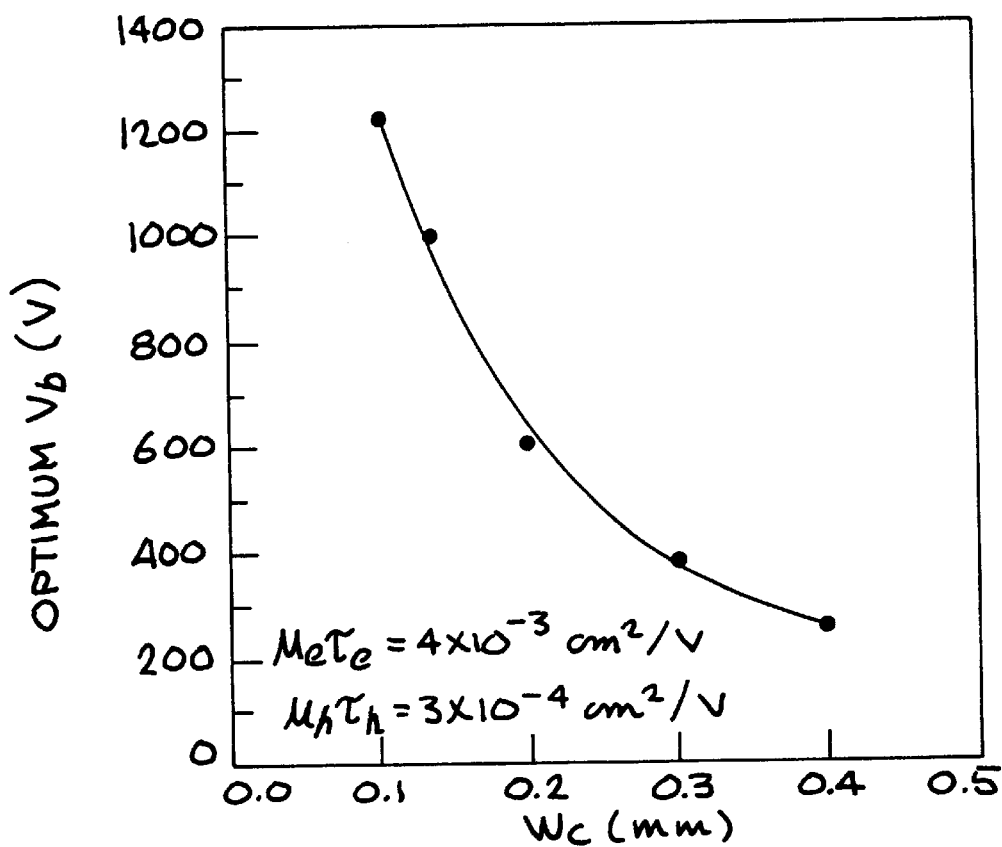
FIG. 11 shows optimum detector bias voltage as a function of collecting grid line width.

In practice, it is difficult to predetermine the electrode widths that would perfectly optimize the detector for single-electrode readout. This would require precise measurement of the detector material carrier transport characteristics combined with detailed simulations of the detector response. Fortunately, the optimum detector configuration also depends on the detector bias voltage. By changing the bias voltage applied across the detector, the extent of electron trapping is varied and can be made to match that needed for optimum performance given a specific grid geometry. This is illustrated in FIG. 10B which plots the charge induction efficiency for the $w_c=0.2$ mm case for a number of bias values. From FIG. 10A, it is clear that $w_c=0.2$ mm does not produce the optimal detector performance at a bias of 1000 V. But, FIG. 10B shows that the performance of this case can be greatly improved by decreasing the bias to 606 V. The charge induction efficiency becomes approximately as flat as that of the optimum electrode width for operation at 1000 V (FIG. 10A, $w_c=0.14$ mm case). A negative consequence of a smaller optimum bias is that more electron trapping takes place and thus a smaller fraction of the total created charge is actually collected. Even though the absolute variation in the charge induction efficiency as a function of depth is approximately the same for the two optimized detectors, the one whose optimum bias is lower will have poorer detector performance, in part because the fractional variation in charge induction is larger. Lower bias operation also increases the detrimental effects to spectral performance caused by spatial variations of charge transport within the detector material and ballistic deficits in the measurement electronics. Therefore grid designs that give a higher optimal bias are desirable. A plot of optimum bias (1200 to 200 V) as a function of collecting grid line width (0.1 to 0.4 mm) for the cases of FIG. 9 is shown in FIG. 11.

Experiments were performed with single-electrode-readout coplanar-grid detectors fabricated from CdZnTe. The detector fabrication process consisted of first mechanically polishing the CdZnTe crystal with alumina powder to produce smooth surfaces. The surface damage caused by the mechanical processing was then removed by chemically etching the crystal in a 2% bromine-methanol solution immediately prior to electrode deposition. Next, gold electrodes were vacuum deposited from a heated tungsten filament, with the grid structure being defined using a shadow mask. Finally, electrical connection was made to the grid electrodes by bonding a gold wire to each individual grid line with silver epoxy. The epoxy was cured at approximately 55° C. for 16 h.

Induced charge signals from alpha particles from an $^{241}$Am source demonstrate the control of the charge induction with adjustment of the grid area. The spectral performance achievable with the detectors after bias optimization is shown by $^{137}$Cs spectra measured with the detectors. Two different collecting grid designs on a 9.5×9.5×8 mm³ CdZnTe crystal were used. The electrode widths and gap sizes are $w_c=0.25$ mm, $W_{nc}=0.75$ mm, and $w_g=0.25$ mm; and $w_c=0.15$ mm, $W_{nc}=0.97$ mm, and $w_g=0.18$ mm. The respective detector biases were $V_b=370$ V and $V_g=30$ V, and $V_b=500$ V and $V_g=40$ V.

By properly designing the charge collection grid of a coplanar-grid detector, good spectroscopic performance can be achieved by measuring the induced charge signal from only this grid. A reduction in electronic noise and the ability to use conventional single-amplifier detection electronics results. The success of this single-electrode-readout technique relies on designing the grid electrodes such that the optimum operating bias is sufficiently large. To achieve this, it is more desirable to decrease the collecting grid size rather than increasing the size of the noncollecting grid in order to maintain a small center-to-center grid line spacing.

This invention can be applied to any radiation detectors based on ionization measurements. The detector body can be a solid, or it can be a liquid or gas filled chamber. One particularly important application is in compound semiconductor gamma-ray detectors. These detectors can be operated at room temperature and have the potential of achieving energy resolution comparable to cryogenic detectors. Currently, the resolution of these detectors is severely degraded because of poor collection of the positive carriers. In addition, the negative carriers are not collected perfectly.

This invention can be used to overcome such charge collection problems, allowing room-temperature, high-resolution gamma-ray detectors to be realized. This could provide substantial benefits to many areas of applications, e.g., radioactive waste management, environmental monitoring, nuclear safeguards, medical diagnostics, gamma-ray astronomy, material analysis, nuclear physics and industrial sensing.

Changes and modifications in the specifically described embodiments can be carried out without departing from the scope of the invention which is intended to be limited only by the scope of the appended claims.

What is claimed is:

1. An ionization detector, comprising:
   a detector body in which charge carriers are produced by absorption of radiation;
   a full-area electrode on one face of the detector body;
   a pair of coplanar interdigitated electrodes comprising a collecting electrode and a noncollecting electrode formed on an opposed face of the detector body;
   a bias voltage source connected between the pair of interdigitated electrodes and the full-area electrode to apply a bias voltage across the detector body to separate and collect the charge carriers by polarity;
   a grid voltage source connected between the collecting and noncollecting electrodes to apply a grid voltage to collect charge carriers of one polarity at the collecting electrode;
   a readout device connected to only the collecting electrode of the pair of interdigitated electrodes.

2. The detector of claim 1 wherein the detector body is formed of a semiconductor material.

3. The detector of claim 1 wherein the bias voltage source and grid voltage source have polarities to collect negative charge carriers at the collecting electrode.

4. The detector of claim 1 wherein the collecting and noncollecting electrodes have relative areas which produce a readout device output signal which is substantially independent of radiation interaction depth in the detector body.

5. The detector of claim 4 wherein the relative areas of the noncollecting electrode to the collecting electrode are in the range of about 1:1 to about 20:1.

6. The detector of claim 4 wherein the bias voltage is selected to further produce a readout device output signal which is substantially independent of radiation interaction depth in the detector body.

7. The detector of claim 1 wherein the collecting and noncollecting electrodes each comprise a plurality of linear strip electrode elements.

8. The detector of claim 7 wherein the linear strips have relative line widths selected to control the spectral response of the detector.

9. The detector of claim 8 wherein the bias voltage is selected to further control the spectral response of the detector.

10. The detector of claim 7 wherein the collecting electrode elements have a line width substantially less than the noncollecting electrode elements.

11. The detector of claim 7 wherein the collecting electrode elements have a line width in the range of about 0.1 mm to about 1.0 mm.

12. The detector of claim 1 wherein the detector body is a liquid or gas filled chamber.

13. The detector of claim 1 wherein the readout device comprises a single induced charge signal amplifier.

14. An ionization detector, comprising:
    a detector body in which charge carriers are produced by absorption of radiation;
    a cathode formed on one surface of the detector body to collect positive charge carriers;
    an anode comprising a pair of coplanar interdigitated electrodes formed on an opposed surface of the detector body to collect negative charge carriers;
    a single electrode readout device connected to one of the pair of interdigitated electrodes to measure an induced charge signal from the electrode to which the readout device is connected;
    wherein the pair of interdigitated electrodes have areas so that the induced charge signal is substantially independent of the distance from the cathode where the charge carriers are produced.

15. The detector of claim 14 wherein the area of the interdigitated electrode to which the readout device is connected is substantially lower than the area of the other interdigitated electrode.

16. The detector of claim 14 further comprising a bias voltage source connected between the cathode and anode, wherein the bias voltage is also selected so that the induced charge signal is substantially independent of the distance from the cathode where the charge carriers are produced, and further wherein the interdigitated electrode areas are selected so that the bias voltage is sufficiently large to reduce charge trapping effects.

17. A method for detecting ionizing radiation, comprising:
    absorbing radiation in a detector body to produce charge carriers, the detector body having a first electrode on one surface thereof and a pair of coplanar interdigitated electrodes on an opposed surface thereof;
    applying a bias voltage between the first electrode and the pair of interdigitated electrodes so that charge carriers of one polarity are collected at the first electrode and charge carriers of the opposite polarity migrate toward the pair of interdigitated electrodes;
    applying a grid voltage between the pair of interdigitated electrodes so that the charge carriers of the opposite polarity are collected at only one of the pair of interdigitated electrodes;
    detecting an induced charge signal from only the interdigitated electrode which collects the charge carriers of the opposite polarity.

18. The method of claim 17 further comprising forming the pair of interdigitated electrodes of electrode elements having relative areas so that the induced charge signal is substantially independent of the distance from the first electrode where the charge carriers are produced.

19. The method of claim 18 further comprising selecting the bias voltage so that the induced charge signal is substantially independent of the distance from the first electrode where the charge carriers are produced.

20. The method of claim 17 wherein the bias voltage and grid voltage have a polarity so that negative charge carriers are collected at the interdigitated electrode which collects charge carriers.

* * * * *